United States Patent
Karam et al.

(10) Patent No.: US 9,330,330 B2
(45) Date of Patent: May 3, 2016

(54) POLARIZED MILLIMETER WAVE IMAGING SYSTEM AND METHOD

(71) Applicants: Mostafa A. Karam, Moorpark, CA (US); Kent Anderson, Azusa, CA (US); Raj K. Shori, North Hills, CA (US); A. Douglas Meyer, Woodland Hills, CA (US)

(72) Inventors: Mostafa A. Karam, Moorpark, CA (US); Kent Anderson, Azusa, CA (US); Raj K. Shori, North Hills, CA (US); A. Douglas Meyer, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 207 days.

(21) Appl. No.: 14/156,095

(22) Filed: Jan. 15, 2014

(65) Prior Publication Data
US 2015/0198703 A1    Jul. 16, 2015

(51) Int. Cl.
| | | |
|---|---|---|
| *G01S 13/89* | (2006.01) | |
| *G01J 5/60* | (2006.01) | |
| *G06K 9/46* | (2006.01) | |
| *G01K 11/00* | (2006.01) | |
| *G01S 7/499* | (2006.01) | |
| *G06K 9/00* | (2006.01) | |

(Continued)

(52) U.S. Cl.
CPC ............... *G06K 9/4604* (2013.01); *G01J 5/60* (2013.01); *G01K 11/006* (2013.01); *G01S 7/499* (2013.01); *G01S 13/89* (2013.01); *G06K 9/00577* (2013.01)

(58) Field of Classification Search
CPC ......... G06K 9/36; G06K 9/46; G06K 9/4604; G06K 9/00577; H01L 2224/00; G01K 11/006; G01V 8/005; G01S 13/89; G01S 3/02; G01S 3/14; G01S 3/146; G01S 3/56; G01S 13/02; G01S 13/04; G01S 7/02; G01S 7/024; G01S 7/025; G01S 7/04; G01S 7/48; G01S 7/499; G01J 1/10; G01J 1/16; G01J 2001/1605; G01J 1/42; G01J 3/28; G01J 3/447; G01J 4/00; G01J 2004/001; G01J 4/04; G01J 5/50; G01J 5/60; H01Q 3/26; H01Q 3/267; H03D 1/08; H03D 1/10
USPC ......... 342/27, 28, 89–93, 175, 188, 195, 350, 342/351, 176, 179, 361–366, 385, 417, 422, 342/425; 382/100, 103; 250/200, 216, 225
See application file for complete search history.

(56) References Cited

U.S. PATENT DOCUMENTS

| | | | | |
|---|---|---|---|---|
| 3,689,924 A | * | 9/1972 | Caruso, Jr. ............... | G01S 3/146 342/351 |
| 3,883,876 A | * | 5/1975 | Roeder .................... | G01S 3/56 342/425 |
| 4,053,882 A | * | 10/1977 | Van Etten ............... | G01S 7/025 342/188 |

(Continued)

*Primary Examiner* — Bernarr Gregory
(74) *Attorney, Agent, or Firm* — Tarolli, Sundheim, Covell & Tummino LLP

(57) ABSTRACT

A detection system includes a polarization analyzer that generates one or more null detection values if an object is sensed in a received millimeter wave (MMW) brightness temperature data set. The polarization analyzer analyzes a polarization parameter in the received MMW brightness temperature data set to generate the one or more null detection values. An object detector detects if the object is present based on a comparison of the one or more null detection values to a predetermined threshold. A singular value decomposition (SVD) unit is enabled by the object detector to decompose the MMW brightness temperature data set into a plurality of image layers. Each image layer includes at least one feature of a scene. An identification unit analyzes the plurality of image layers from the SVD unit to determine a shape or a location of the object from the scene.

20 Claims, 11 Drawing Sheets

(51) Int. Cl.
*G01S 13/00* (2006.01)
*G01J 5/00* (2006.01)

(56) References Cited

U.S. PATENT DOCUMENTS

| | | | | | |
|---|---|---|---|---|---|
| 4,119,968 | A | * | 10/1978 | Goldfischer | G01S 7/04 342/351 |
| 4,160,251 | A | * | 7/1979 | Lazarchik | G01S 13/04 342/188 |
| 4,323,898 | A | * | 4/1982 | Barnes | G01S 7/024 342/188 |
| 4,323,899 | A | * | 4/1982 | Barnes | G01S 7/024 342/188 |
| 4,333,008 | A | * | 6/1982 | Misek | G01S 7/499 250/225 |
| 4,521,861 | A | * | 6/1985 | Logan | G01V 8/005 342/351 |
| 5,073,782 | A | * | 12/1991 | Huguenin | G01V 8/005 342/351 |
| 5,227,800 | A | * | 7/1993 | Huguenin | G01S 13/89 342/351 |
| 5,394,157 | A | * | 2/1995 | Garneski | H01Q 3/267 342/351 |
| 5,815,113 | A | * | 9/1998 | Lo | H03D 1/10 342/351 |

* cited by examiner

POLARIZED MILLIMETER WAVE IMAGING SYSTEM AND METHOD

TECHNICAL FIELD

This disclosure relates to millimeter wave imaging systems, and more particularly to a system and method that utilizes polarized millimeter wave imaging.

BACKGROUND

An explosive formed penetrator (EFP), also known as an explosive formed projectile, is a self-forging warhead or a self-forging fragment from a special type of shaped charge designed to penetrate armor at standoff distances. The effect of explosive charge is to deform a metal plate into a slug or rod shape as well as accelerating it towards the targets. A conventionally-shaped charge generally has a conical metal liner that projects a hypervelocity jet of metal able to penetrate to great depths into steel armor. In travel over some distance, the jet breaks up along its length into particles that drift out of alignment, greatly diminishing its effectiveness at a distance. In contrast, an EFP has a liner face in the shape of a shallow dish. Thus, the force of the blast molds the liner into any of a number of shapes, depending on the shape of the plate and how the explosive is detonated. Some sophisticated EFP warheads have multiple detonators that can be fired in different arrangements causing different types of waveform in the explosive, resulting in a long-rod penetrator, an aerodynamic slug projectile, or multiple high-velocity fragments. A less sophisticated approach for changing the formation of an EFP is through the use of a wire-mesh in front of the liner where the mesh in place of the liner fragments into multiple penetrators.

The EFP are typically buried in the ground or hidden under debris to avoid detection. One example system for detecting EFP's is through the use of Millimeter Wave (MMW) radiometers that are passive radars measuring thermal radiations emitted from targets at MMW frequencies and represented by the brightness temperature. Millimeter Wave is the radiation band with wavelengths from about one millimeter to about 10 millimeters. As radio waves are considered low band frequency, millimeter waves are designated as very high frequency ranging from 30-300 GHz. Regardless of the frequency of the radiation, just like light, millimeter waves can be found throughout the environment. One problem with existing millimeter wave systems is that they have trouble differentiating an arbitrary wet dielectric surface from a metallic surface which can confuse the detection system when attempting to identify an EFP. One attempt at mitigating this problem is through the use of a Weiner filter. However, the Weiner filter is not capable of suppressing extraneous clutter surrounding the EFP image since such filters are only capable of suppressing noise through statistical approaches.

SUMMARY

This disclosure relates to millimeter wave imaging and detection systems and methods. In one aspect, a detection system includes a polarization analyzer that generates one or more null detection values if an object is sensed in a received millimeter wave (MMW) brightness temperature data set. The polarization analyzer analyzes a polarization parameter in the received MMW brightness temperature data set to generate the one or more null detection values. An object detector detects if the object is present based on a comparison of the one or more null detection values to a predetermined threshold.

In another aspect, a detection system includes a polarization analyzer that generates one or more null detection values if an object is sensed in a received millimeter wave (MMW) brightness temperature data set. The polarization analyzer analyzes a polarization parameter in the received MMW brightness temperature data set to generate the one or more null detection values. An object detector detects if the object is present based on a comparison of the one or more null detection values to a predetermined threshold. A singular value decomposition (SVD) unit is enabled by the object detector to decompose the MMW brightness temperature data set into a plurality of image layers. Each image layer includes at least one feature of a scene. An identification unit analyzes the plurality of image layers from the SVD unit to determine a shape and/or a location of the object from the scene.

In yet another aspect, a method includes generating one or more null detection values if an object is sensed in a received millimeter wave (MMW) brightness temperature data set. The one or more null detection values are generated from a polarization parameter in the received MMW radiation data set. The method includes detecting if the object is present based on a comparison of the one or more null detection values to a predetermined threshold. The method includes decomposing the received MMW brightness temperature data set into a plurality of image layers. Each image layer includes at least one feature of a scene. The method includes analyzing the plurality of image layers to determine a shape or a location of the object from the scene.

DETAILED DESCRIPTION

This disclosure relates to a polarized millimeter wave (MMW) imaging radiometry system and method for detecting and identifying objects such as explosive formed penetrators (EFP), for example. The system comprises a polarized MMW imaging radiometer unit, a detection unit, a singular value decomposition unit (SVD) and an identification unit. The polarized MMW imaging radiometer unit can be a 90 gigahertz (GHz) pushbroom (linear array antenna) radiometer, for example, that is capable of capturing thermal radiation of a scene and generating representative two-dimensional (2D) images of the scene. The detection unit utilizes the generated images, and analyzes the images based on values of either polarization difference or polarization index. From this analysis, the detection unit determines if any of the images of the scene contain null values, which are values that correspond to a brightness temperature of an ambient sky. If the images contain null values, the null values can be indicative that an object within the images has characteristics similar to an EFP, which typically has a brightness temperature similar to the ambient sky.

If it is determined that an object with EFP characteristics is present within the images, the images can be utilized by the system to determine if the object is an actual EFP. The SVD unit receives the images from the detection unit and decomposes each image into several image layers (modes) by performing singular value decomposition on each image. Each mode that is generated is associated with certain features of an image of a scene (e.g., clutter, rock, EFP, wood). Additionally, the SVD unit calculates SVD moments for each respective mode, which are utilized by the identification unit for cross tracking location of the EFP from a corresponding SVD moment of a respective mode. The identification unit utilizes the modes that have been generated by the SVD unit and determines, which mode, if any, has the EFP. If the identification unit determines that an EFP has been detected within one of the modes, the identification unit obtains cross track location of the EFP from corresponding SVD moments of the remaining modes. That is, the identification unit is capable of determining the distance between the polarized (MMW) imaging radiometry system and the EFP.

Figure 1:
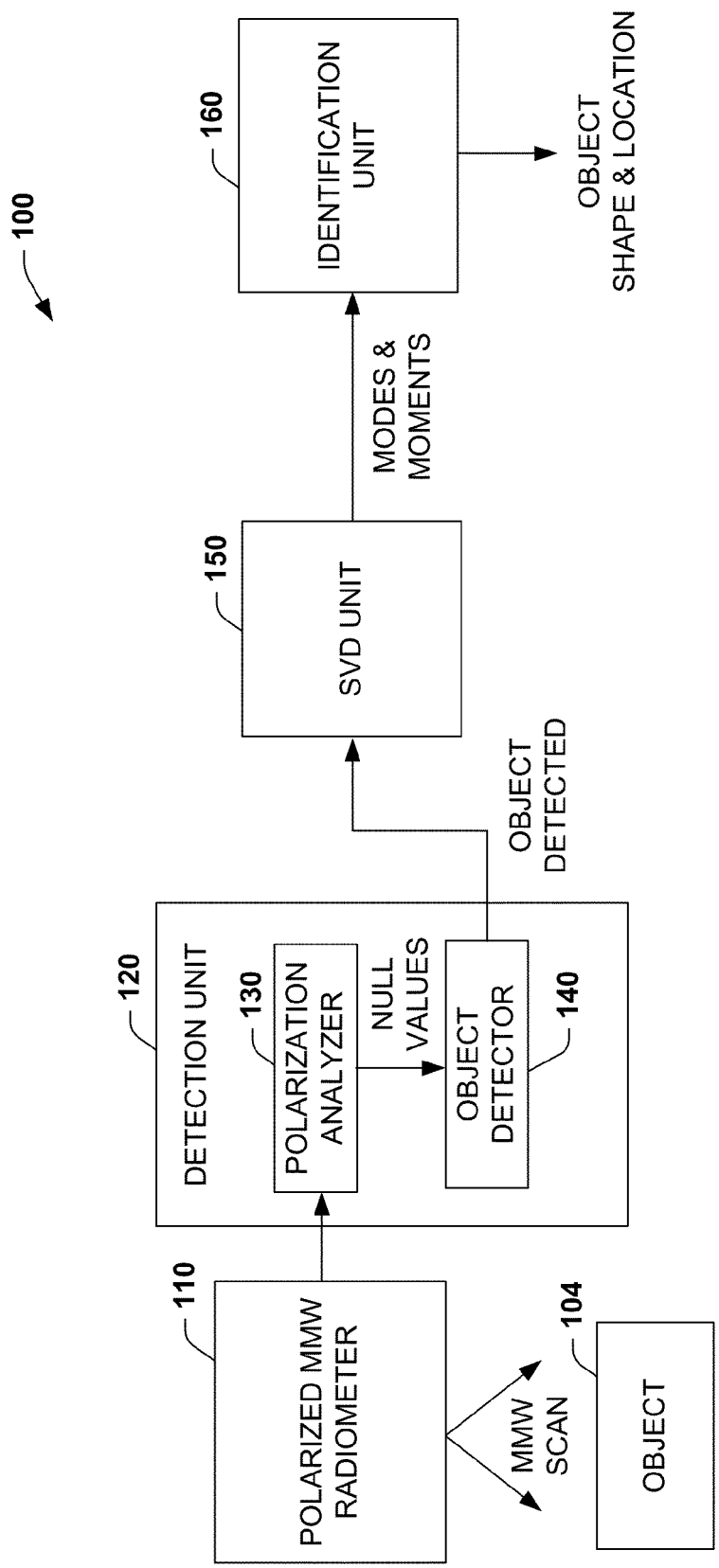
FIG. 1 illustrates an example of a detection system that employs polarized millimeter wave imaging to detect the presence of a concealed object.

FIG. 1 illustrates an example of a detection system 100 that employs polarized millimeter wave imaging to detect the presence of a concealed object 104. The system 100 includes a polarized millimeter wave (MMW) radiometer 110 (also referred to as radiometer 110) to acquire scene image scans via a MMW beam that is scanned across a given area. The polarized MMW radiometer 110 can be mounted on a mobile platform as will be illustrated and described below with respect to FIG. 2. Output from the polarized MMW radiometer 110 is received by a detection unit 120. The detection unit 120 includes a polarization analyzer 130 that generates one or more null detection values if the object 104 is sensed in a received millimeter wave (MMW) brightness temperature data set from the radiometer 110. The polarization analyzer 130 analyzes a polarization parameter that can include a polarization difference or a polarization index in the received MMW radiation data set to generate the one or more null detection values. An object detector 140 detects if the object 104 is present based on a comparison of the one or more null detection values to a predetermined threshold. For example, if the magnitude of null detection values exceeds a given numeric threshold, the object detector 140 can indicate (e.g., via a flag) that the object 104 has been detected.

If the object 104 has been detected, a singular value decomposition (SVD) unit 150 is enabled by the object detector 140 to decompose the MMW brightness temperature data set into a plurality of image layers which are also referred to as modes. Each image layer or mode includes at least one feature of a scene that can include background noise, background clutter, ground debris, or the object 104, for example. An identification unit 160 analyzes the plurality of image layers from the SVD unit 160 to detect the shape or location of the object 104. As shown, the SVD unit 150 can also generate a moment with respect to each image layer where the moments can be analyzed by the identification unit 160 as signal diagrams to identify the intensity, shape, and/or location of the object 104. In one example, the object 104 can be an explosive formed penetrator (EFP) which can be detected under varying conditions such as being covered by ground debris, vegetation, or wood, for example.

The polarization difference can be computed by the polarization analyzer 130 as $\Delta_{hv}=T_h-T_v$, where $T_h$ and $T_v$ are the horizontal and vertical brightness temperature components received from the polarized MMW radiometer 110 at a given observation angle $\theta$. The polarization index can be defined by $\delta_{hv}=(T_h-T_v)/(T_h+T_v)$ at the given observation angle. Another parameter that can be employed by the polarization analyzer 120 includes a temperature average $T_{avg}=(T_h+T_v)/2$ to detect contrast between cold sky temperature reflected from the object 104 and warm background terrain, for example. As will be described below, the SVD unit 150 can generate a filtered image of the object 140 by summing the plurality of image layers. The polarized MMW radiometer 110 can include a linear antenna array to scan in an x, y, and z dimension and can be mounted on a mobile platform, for example. The linear antenna array can generate a pushbroom fan beam that scans in the y and z dimensions and the x dimension can be covered by motion of the mobile platform.

In one example, the polarized MMW radiometer 110 acquires 2D images from scenes under consideration, where the detection unit 120 detects the absence or presence of the object 104 such as an EFP through analyzing the images. If the presence of the EFP is confirmed, for example, the SVD unit 150 decomposes the images into their SVD modes and moments, which are used by the identification unit 160 to identify EFP shape and/or location. The system 100 can be employed in extracting EFP images (or other objects) from background noise and clutter. The system 100 can be utilized for penetrating concealment items for the object 104 such as light vegetation, and it has the capability of discriminating against clutter such as rocks, metal, water, and so forth. The system 100 could also be mounted on a vehicle operating while driving at about 5 to 15 mph, for example. In another example, the polarized MMW radiometer 110 could be mounted on the mobile platform whereas the detection unit 120, the SVD unit 150, and/or the identification unit 160 could operate at a remote location from the radiometer 110 while receiving MMW scan data from the radiometer.

An explosive formed penetrator (EFP), also known as explosive formed projectile, can be considered a self-forging warhead or a self-forging fragment which is a special type of shaped charge designed to penetrate armor at standoff distances. The effect of explosive charge is to deform a metal plate into a slug or rod shape as well as accelerating it toward the targets. On the other hand, MMW radiometers 110 are passive radars that measure thermal radiations emitted from targets at MMW frequencies. In general, MMW sensors, radiometers or scatterometers (active radars) have greater penetration capabilities irrespective to time of the day and/or weather conditions. As such, such sensors can be considered all day and/or all weather sensors. As for the radiometers 110, being passive makes them more covert and hard to be detected or tracked. In addition, they do not require power to illuminate targets which makes them lighter and less expensive than scatterometers. Moreover, unlike scatterometers, radiometers 110 generally have no speckle issues, no signal fluctuations, or limited angles of observation, for example. For the above reasons, an imaging MMW radiometer, which acquires 2D images, is employed by the system 100 for detecting EFPs and/or other objects of interest. The images acquired by the radiometer 110 can be decomposed into their SVD modes and moments that are used in detecting the presence or absence of EFPs.

As noted above, the detection unit 120 can analyze images based on values of either polarization difference $\Delta_{hv}$ ($\Delta_{hv}=T_h-T_v$) or polarization index $\delta_{hv}$ $\{\delta_{hv}=(T_h-T_v)/(T_h+T_v)\}$ in confirming the presence of an EFP. These types of images generate null values in the presence of either EFPs or a metallic surface, for example. Accordingly, the detection unit 120 inspects images for polarization differences and/or polarization indexes, to determine if those images have null values, where the detection unit confirms the presence of the object 104 and the system 100 then proceeds to the SVD unit 150 for further analysis. Otherwise, the detection unit 120 receives additional images acquired by the radiometer 110 to continue further detection operations.

One function of the SVD unit 150 is to decompose each scanned image into several image layers or modes. To illustrate such a function, assume that a 2D brightness temperature image acquired by the radiometer 110 could be represented by a rectangular matrix X whose dimension is m×n and also assume that m≥n. Then, the rank of the matrix X is r≤n and its SVD decomposition is given by:

$$X=USV^T \qquad \text{Equation 1}$$

where U is m×n matrix, S is n×n diagonal matrix, V is n×n matrix, and the superscript $_T$ stands for matrix transpose (transpose is interchanging rows and columns). The columns of U which are referred to as the left singular vectors, $\{u_i\}$, form an orthonormal basis for cross track direction, ($u_i \cdot u_j=1$ for i=j and $u_i \cdot u_j=0$ otherwise). Rows of $V^T$ which contain elements of the right singular vectors $\{v_i\}$ form orthonormal basis for down track direction. In addition, elements of S are only on the diagonal S=diag($\sigma_1, \sigma_2, \ldots, \sigma_r$) and are called the singular values which are arranged in a descending order $\sigma_1, \geq \sigma_2 \geq \ldots \geq \sigma_r \geq 0$.

Upon receiving SVD of the data matrix X, the SVD unit 150 analyzes the matrices U, S, and V to obtain SVD modes and moments for the data matrix. To determine the SVD modes rewrite Equation 1 as:

$$X = \sum_{i=1}^{r} \sigma_i u_i v_i = \sum_{i=1}^{r} X_i \qquad \text{Equation 2}$$

where $X_i$'s are matrices of the same dimensions as X and they are called the SVD modes of X. Since each mode is represented by a 2D matrix $X_i$ having the same dimensions of the original image matrix X, the mode matrices could be considered as layers of images.

Another feature of SVD decomposition includes determining SVD moments of the data matrix. To obtain the moments, formulate the moment matrix M through a pre-multiply of Equation 1 by the left singular matrix U to yield:

$$M=UX=SV^T \qquad \text{Equation 3}$$

In Equation 3, use the orthonormal property of the matrix U. The moments matrix described by Equation 3 is a linear combination of the vectors within the right singular matrix V. The SVD modes and SVD moments obtained by the SVD unit 150 are then delivered to the identification unit 160. The identification unit 160 uses the SVD modes in constructing 2D images, one image for each SVD mode. Those images can be considered as image layers. Each image layer can be associated with certain features within the scene (e.g., clutter, rock, EFP, and so forth). If the presence of an EFP is detected within an image layer, the identification unit 160 can obtain a cross track location of the EFP (or other detected object) from the corresponding SVD moments.

Figure 2:
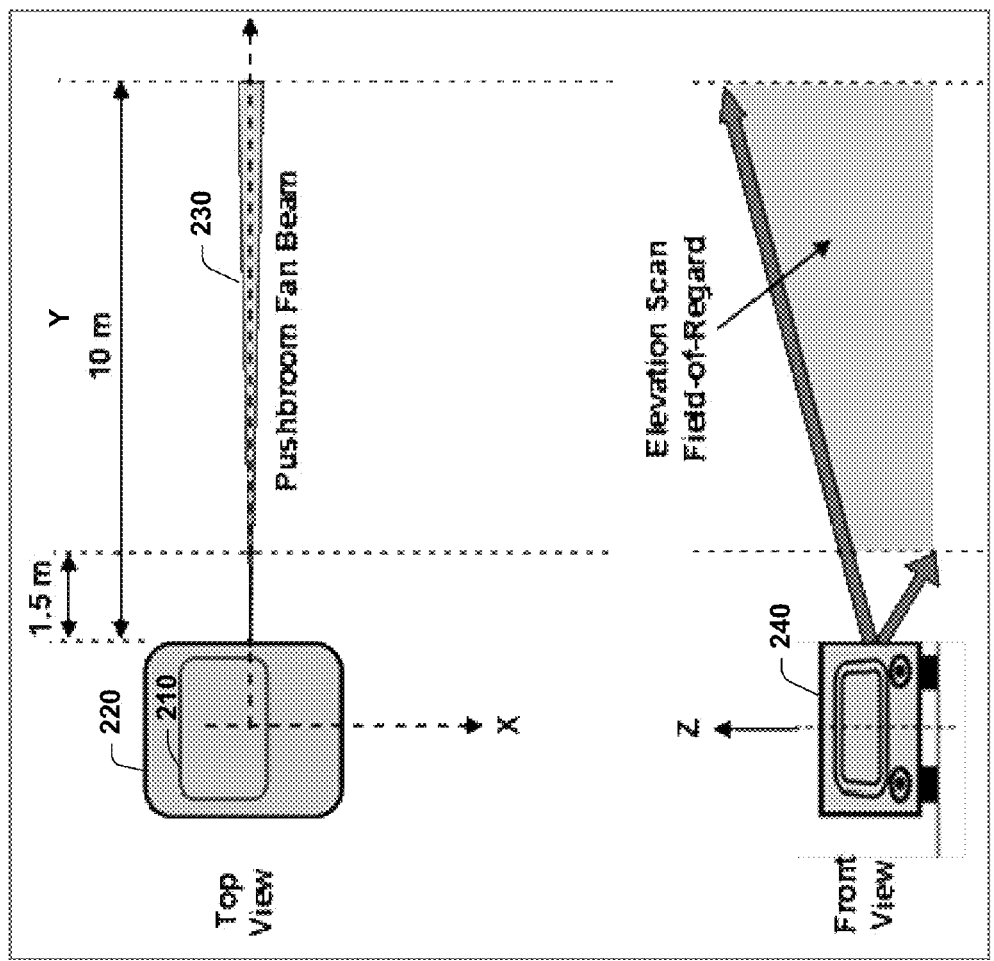
FIG. 2 illustrates an example of a polarized millimeter wave radiometer system to facilitate detection of a concealed object.

FIG. 2 illustrates an example of a polarized millimeter wave (MMW) radiometer to facilitate detection of a concealed object. A polarized MMW radiometer 210 can be mounted on top of a vehicle 220. The polarized MMW radiometer 210 can be a side-looking pushbroom radiometer operating at an atmospheric window at about 90 GHz, for example. As shown, the radiometer 210 projects a pushbroom fan beam across a scene of interest at 230. The projection of the beam is about 11.5 meters along a y-axis, where the vehicle 220 moves the beam along an x-axis across the scene. A front view 240 of the vehicle 220 shows the vertical scanning dimension of the radiometer 210 along a z-axis. At this W-band operating frequency, the radiometer 210 can see through concealments such as cardboard boxes, plastic trash receptacles, artificial rocks, and 0.6 cm of plywood, for example. The radiometer 210 includes an antenna (e.g., linear antenna array) that frequency scans one-dimensionally in elevation and performs focusing in the azimuth direction (cross track, y-axis) forming the fan beam 230.

Figure 3:
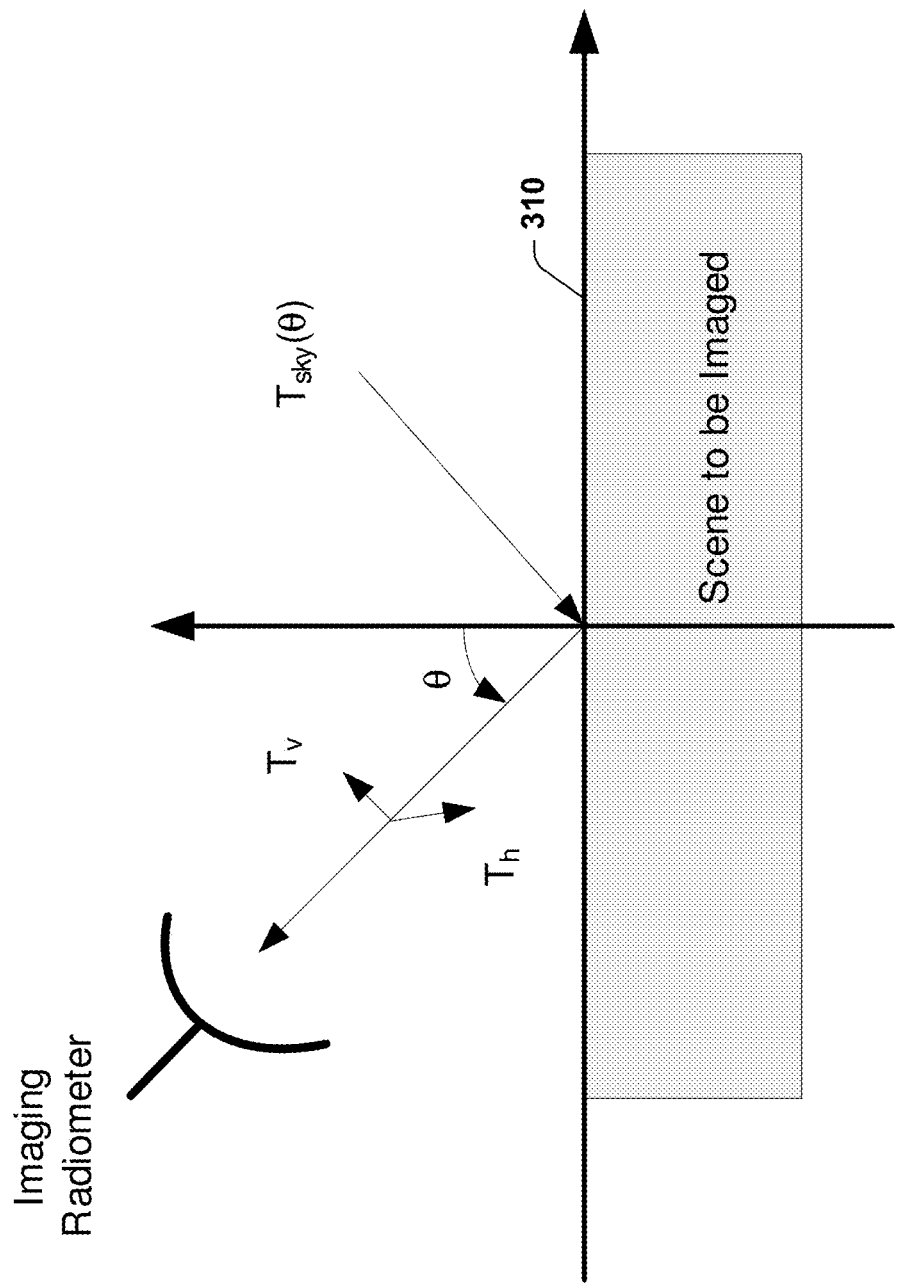
FIG. 3 illustrates a cross-section in the y-z plane that can be covered by this radiometer system illustrated in FIG. 2

FIG. 3 illustrates a cross-section in the y-z plane that may be covered by this radiometer system of FIG. 2, where the x-axis dimension is taken to be swept by vehicle motion (along track). The radiometer creates 2D roadside images using either:

i) Average $T_{av}$ of vertical $T_v$ and horizontal $T_h$ brightness temperatures ii) Polarization difference $\Delta_{hv}$ ($\Delta_{hv}=T_h-T_v$), or iii) Polarization ratio index $\delta_{hv}$ $\{\delta_{hv}=(T_h-T_v)/(T_h+T_v)\}$ The vertical brightness temperature $T_v$ is measured along the vertical polarization direction which is parallel to the plane of observation. The horizontal brightness $T_h$ is measured along the horizontal polarization direction which is perpendicular to the plane of observation. The plane of observation is the plane containing the direction of observation and the normal to scene surface 310.

At MMW frequencies, the dimensions of an EFP (or other object) are typically large compared to the operating wavelength which allows the ability to use physical optics approximation in calculating the p (p=v,h) polarized brightness temperature acquired by the radiometer:

$$T_p(\theta)=\{1-R_p(\theta)\}T+R_p(\theta)T_{sky}(\theta) \qquad \text{Equation 4}$$

where $R_p(\theta)$ is Fresnel reflectivity at the observation angle θ, which may vary from one location to another depending on the scene topography and materials; and $T_{sky}(\theta)$ is the cold sky brightness temperature. For an EFP/metallic surface:

$$R_v(\theta) \approx R_h(\theta) \approx 1 \qquad \text{Equation 5}$$

Introducing Equation 5 into Equation 4 yields the vertical $T_v^{EFP}(\theta)$ and horizontal $T_h^{EFP}(\theta)$ brightness temperature acquired over an EFP or any other metallic surface $$T_v^{EFP}(\theta) \approx T_h^{EFP}(\theta) \approx T_{sky}(\theta) \qquad \text{Equation 6}$$

The Equation 6 identity holds also for wet surfaces due to the higher value of water permittivity (dielectric constant). On the other hand, for a terrain such as vegetation, rock, wood, or dirt, for example, the following considerations can apply:

$$R_p(\theta) < 1$$

$$T >> T_{sky}(\theta)$$

According to these considerations and Equation 6, the brightness temperatures in presence of either an EFP/metallic surface or a wet surface are lower than their counterparts in absence of those types of surfaces. This indicates that imageries based on values of brightness temperature average $T_{avg}$ present a contrast between cold sky temperature reflected from either metallic surfaces including EFPs or wet surfaces and warm background of the terrain. Accordingly, if a cold surface is detected, the system should indicate what type of surface it is. This can be achieved by the detection unit described above with respect to FIG. 1.

FIGS. 4-10 will now be described collectively and illustrate example images, image layers, and moments that can be employed to detect the presence of a concealed object such as an EFP. To evaluate the system, two EFP images were acquired via a pushbroom MMW radiometer imager operating at 76-94 GHz and collecting a 1-D image strip at a 120 Hz readout rate from a 60-cm antenna. The radiometer has a single heterodyne receiver fed by an antenna linear array that frequency scans one-dimensionally in elevation. The intermediate frequency (IF) output drives a beam-forming spectrum analyzer that separates frequency elements (elevation pixels), generating a 1-dimensional elevation scan at a video update rate of up to 120 scans per second. The pushbroom fan beam has 128 pixels, at 0.33° resolution, in the elevation direction. A parabolic-cylinder reflector performs focusing in the azimuth direction, forming a fan beam. The x-axis dimension is swept by vehicle motion with data samples taken at intervals of 1.2 cm. The distance in the y-direction over which the sensor provides imaging is approximately 1.5 m to 10 meters. The field of regard in the elevation dimension is about 45 degrees. The cross-section in the y-z plane that covered by the radiometer system is similar to the cross-section depicted in FIG. 2. The first image shown at 410 of FIG. 4 was acquired for an EFP obscured by background noise. The image of the EFP is shown in dotted line marked 414. The second image shown at 420 of FIG. 4 was acquired for an EFP obscured by both bamboo screen and background noise.

Figure 4:
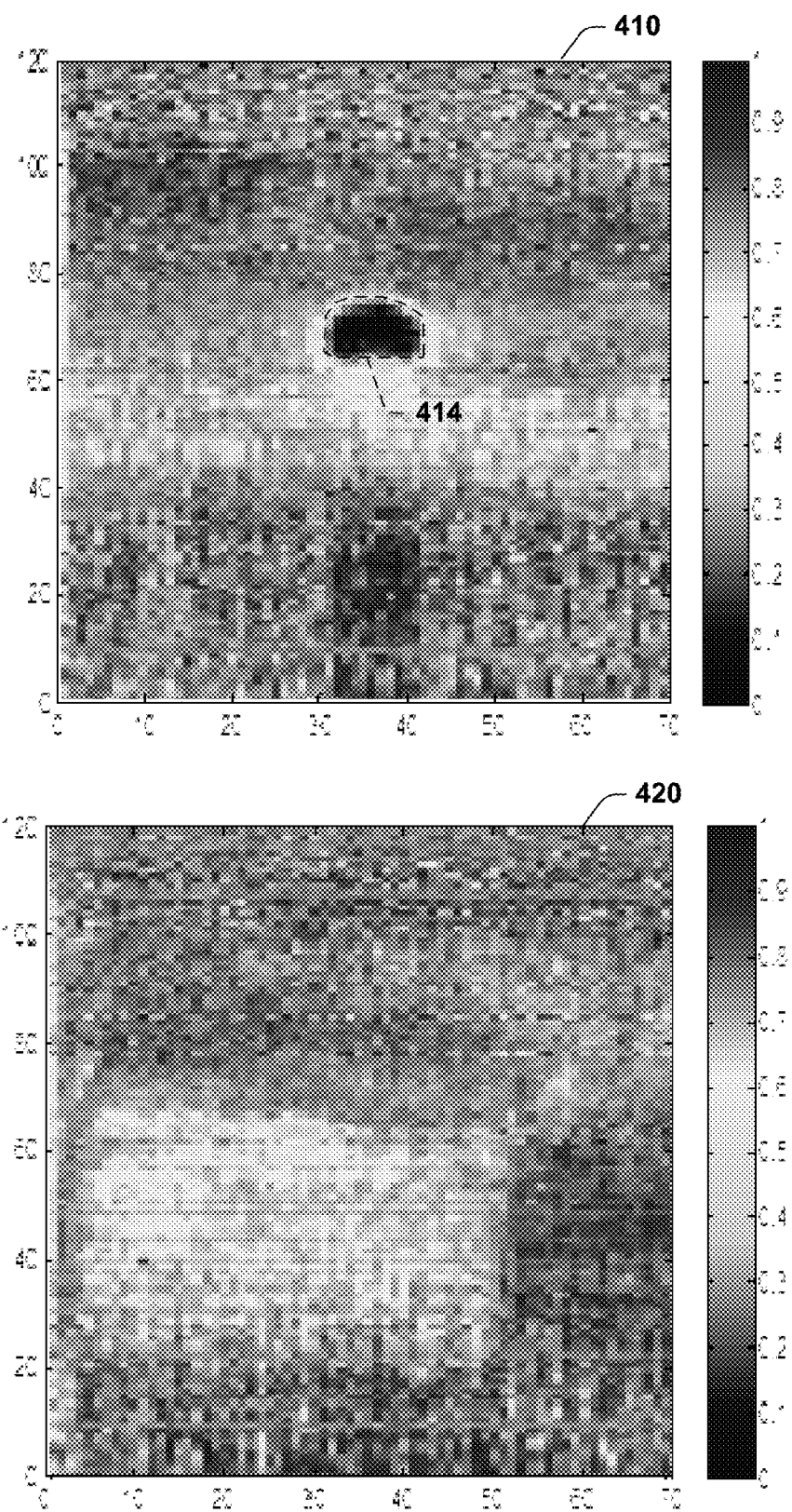
FIG. 4 illustrates an example image of an object obscured by background noise and an example image of an object obscured by background noise and a bamboo screen.
Figure 5:
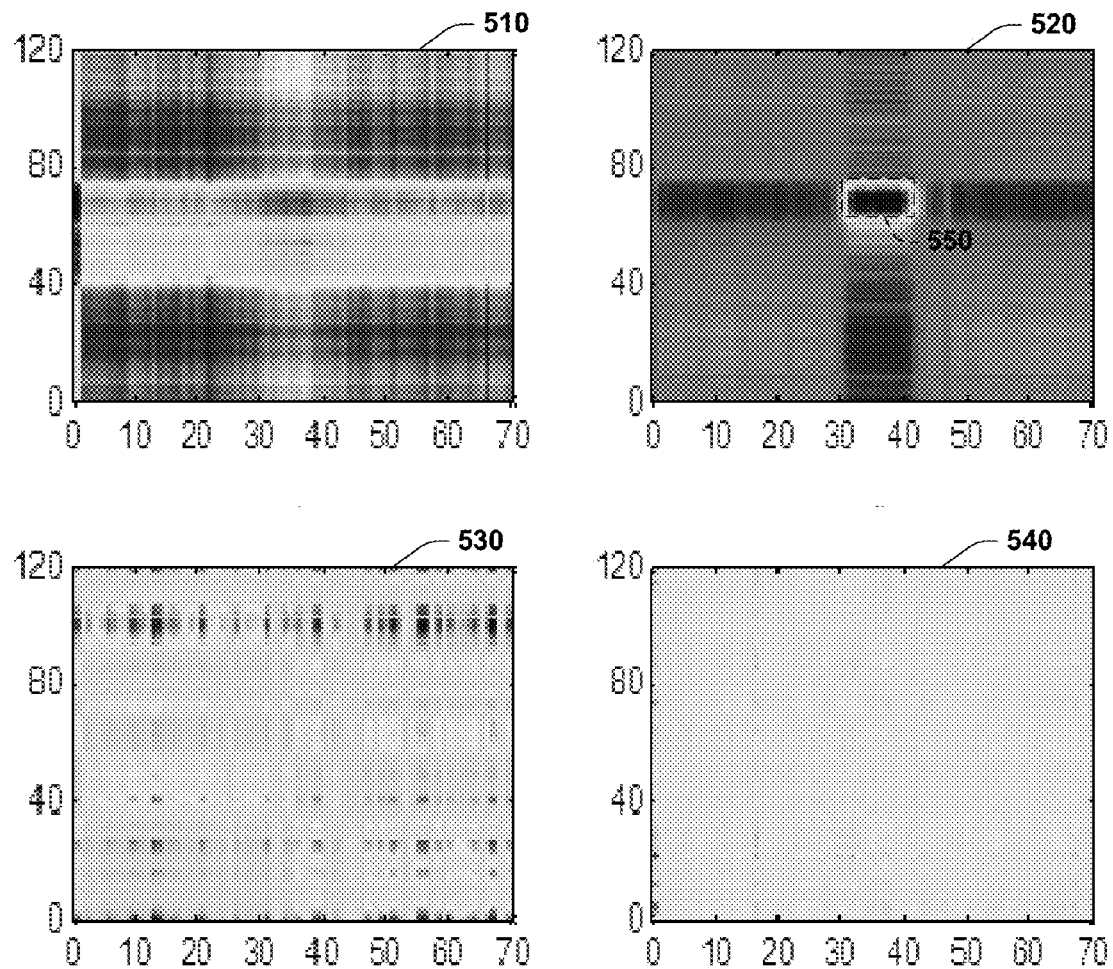
FIG. 5 illustrates example image layers of the object obscured by background noise depicted in FIG. 4.

FIG. 5 illustrates the SVD decomposition of data matrix of the image 410 of FIG. 4 is and used to decompose the image into SVD modes which are also referred to as image layers. The first four image layers (SVD modes) are depicted in FIG. 5 and shown in descending order from layer 510, layer 520, layer 530 and layer 540. Since the singular values of the matrix are arranged in descending orders, the image layers are also arranged in a descending order. It is noted that other layering arrangements are possible. Examining FIG. 5, indicates that each image layer 510-540 is associated with a feature within the radiometer scene. For instance, the second image layer 520 is associated with the EFP, while the first image layer 510 is associated with scene background. On the other hand, the other higher order image layers 530 and 540 are associated with the noise and they could be ignored. When the EFP (or object) image is captured within an image layer, the shape of the image could be inferred from such a layer as shown at 520. This can include shape analysis such as comparing shapes to predetermined images to determine the shape. This can also include mathematical analysis such as curve-fitting, for example. Artificial intelligence could also be employed such as the use of trained classifiers to analyze and determine the shape. In this example, a rectangular shape is shown within the dotted line marked 550 of the image 520.

Figure 6:
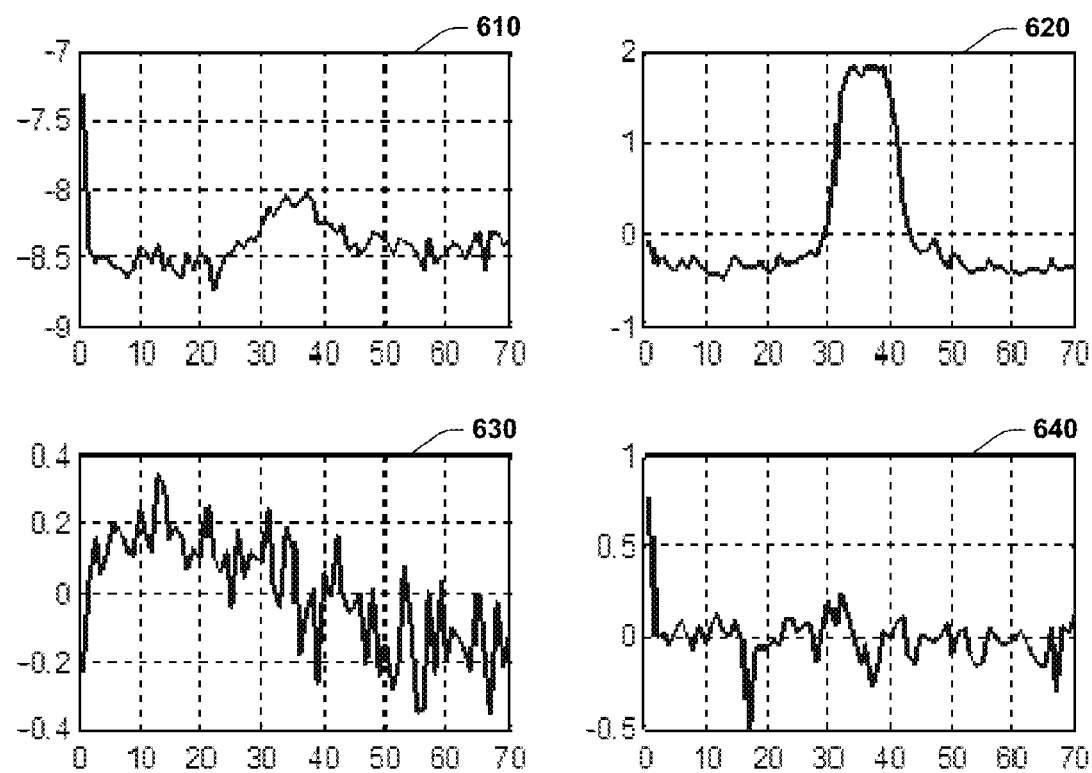
FIG. 6 illustrates example image moments of the object obscured by background noise depicted in FIG. 4.
Figure 7:
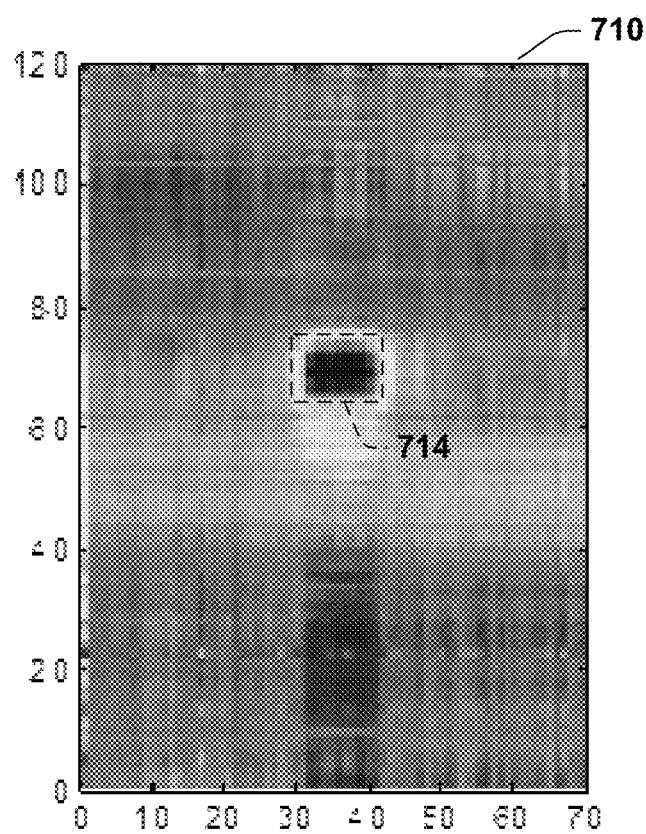
FIG. 7 illustrates an example of a filtered image of the object obscured by background noise depicted in FIG. 4.

If the intensity of the image and its position are required, they could be obtained from the SVD moments depicted at 610, 620, 630 and 640 of FIG. 6. As shown in FIG. 6, the SVD moment associated with the EFP is characterized by a peak with shape having the EFP size and location at 620. On the other hand, if a filtered image for the scene including EFP image is required, it could be obtained through summing the first four image layers as shown at 710 of FIG. 7. A dotted line at 714 shows the filtered EFP image. Summing the first four image layers yields a filtered image with higher quality than filtered image obtained through a prior art Wiener filter, for example.

Figure 8:
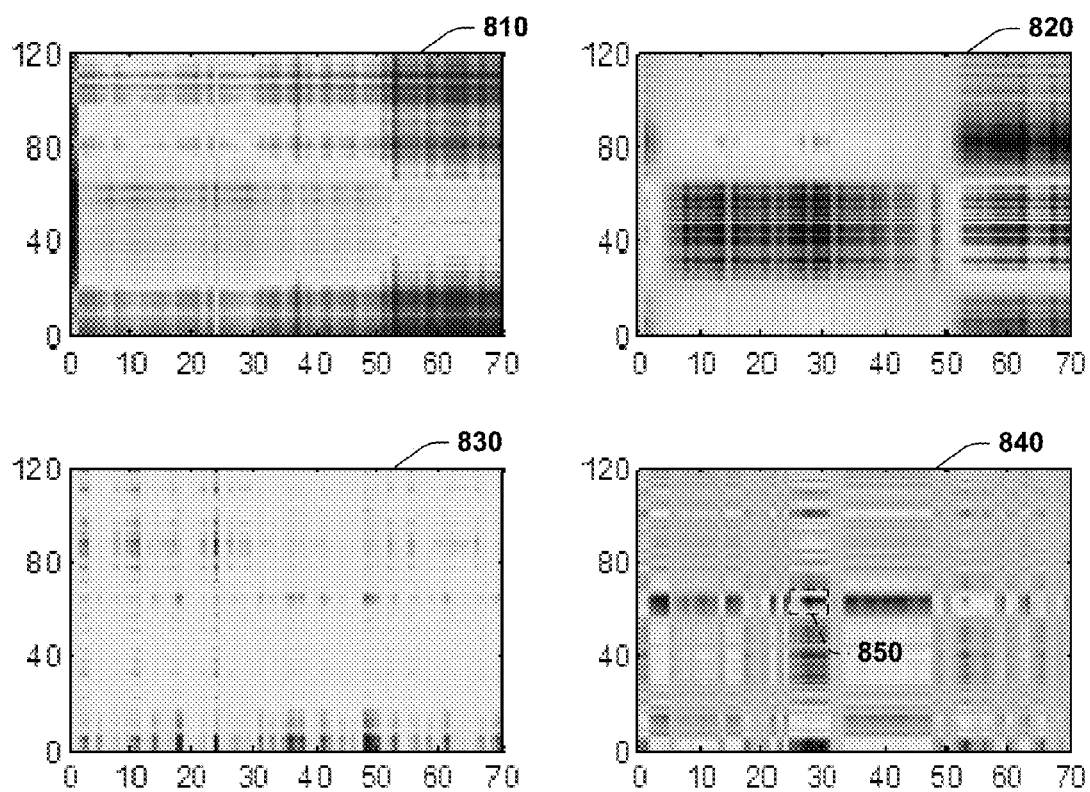
FIG. 8 illustrates example image layers of the object obscured by background noise and bamboo screen depicted in FIG. 4.
Figure 9:
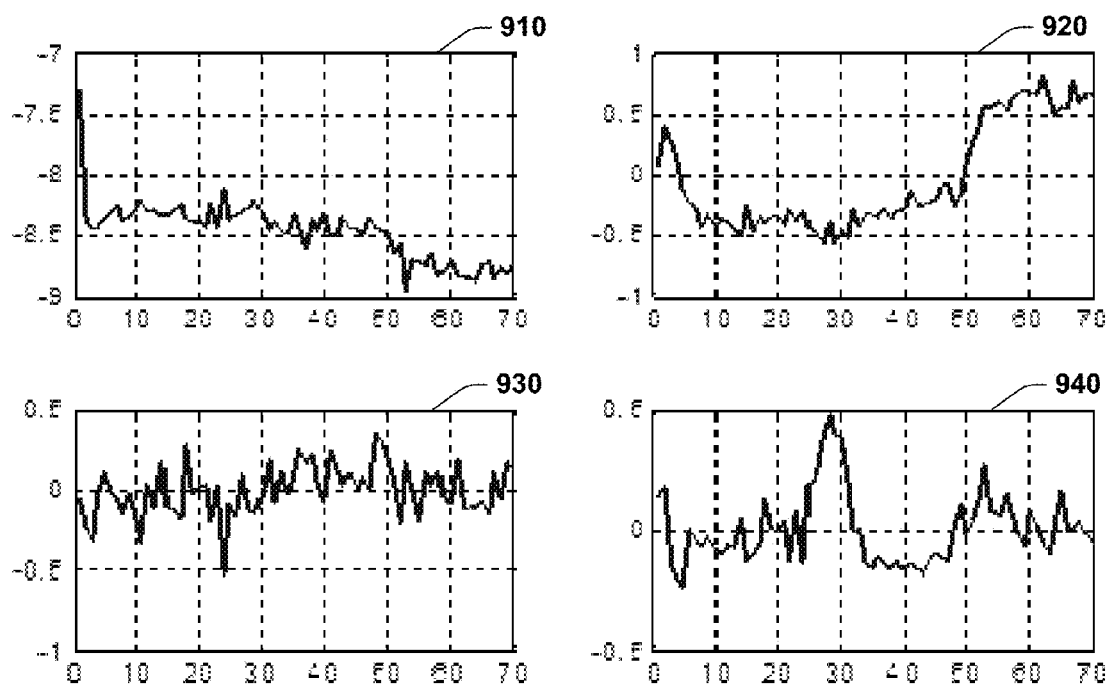
FIG. 9 illustrates example image moments of the object obscured by background noise and bamboo screen depicted in FIG. 4.
Figure 10:
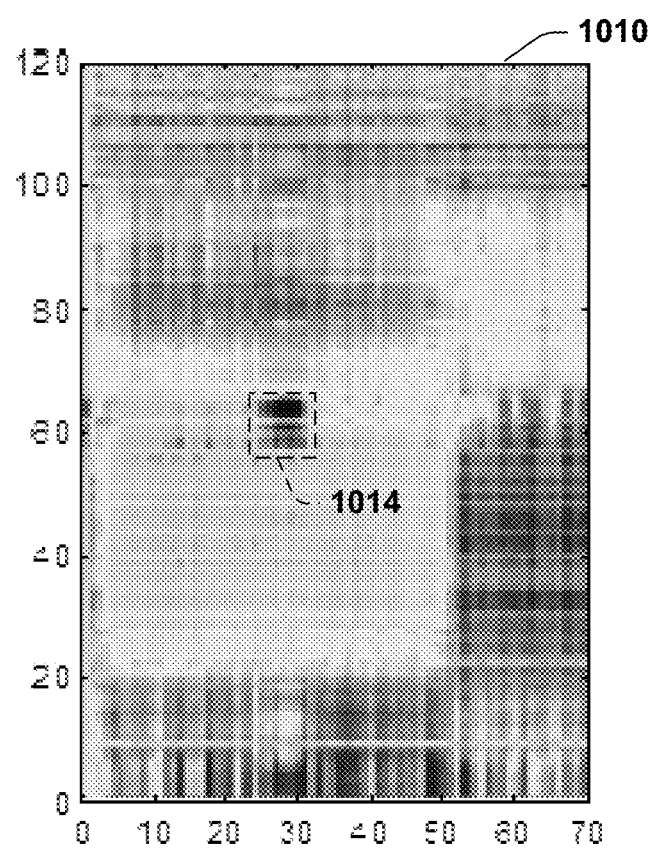
FIG. 10 illustrates an example of a filtered image of the object obscured by background noise and bamboo screen depicted in FIG. 4.

FIGS. 8 and 9 depict the first four image layers (SVD modes) 810-840 and the SVD moments 910-940 of the image 420 of FIG. 4 where the EFP is obscured by background noise and bamboo screen. As shown in FIG. 8, the EFP image in dotted line 850 is captured within the fourth image layer 840, while the first three image layers 810-830 are associated with scene background noise and clutter. Layers with order higher than four are generally associated with noise. In addition, the first and second image layers 810 and 820 are spurious modes, in this example. However their sum yields actual mode representing the image background. The EFP image captured in the fourth image layer is also captured in the fourth SVD moment 940 of FIG. 9. FIG. 10 shows a filtered image 1010 obtained through summing the first four image layers of FIG. 8. The EFP is depicted in dotted line 1014.

Figure 11:
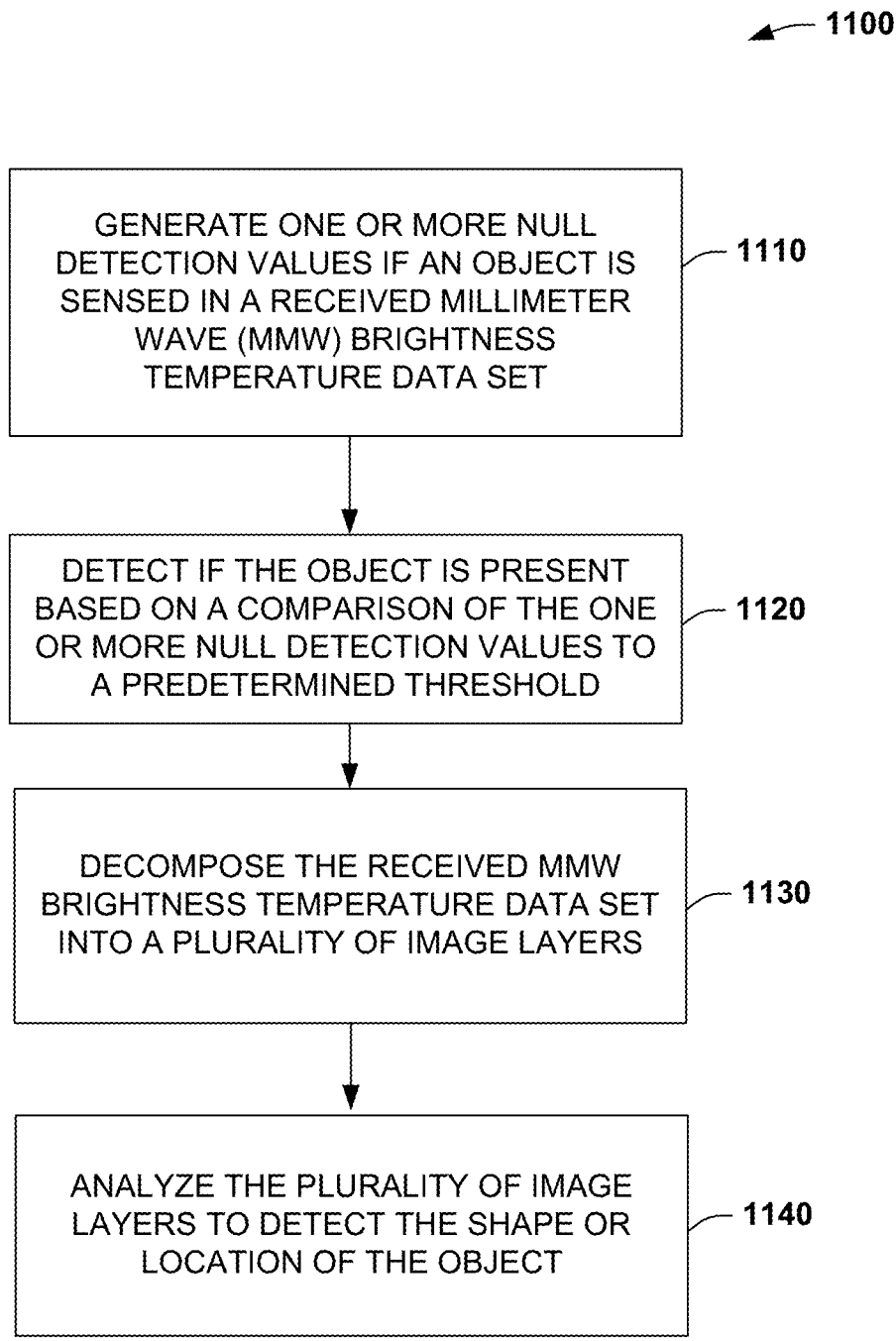
FIG. 11 illustrates an example of a method that employs polarized millimeter wave imaging to detect the presence of a concealed object.

In view of the foregoing structural and functional features described above, a methodology in accordance with various aspects of the present invention will be better appreciated with reference to FIG. 11. While, for purposes of simplicity of explanation, the methodology is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the method depicted in FIG. 11 can be executed automatically such as via a processor, computer, and/or controller configured with executable instructions to carry out the various acts described herein. Moreover, discrete circuit control implementations are possible in addition to hybrid controls that include both discrete and integrated circuit processing elements.

FIG. 11 illustrates an example of a method 1100 that employs polarized millimeter wave imaging to detect the presence of a concealed object. At 1110, the method 1100 includes generating one or more null detection values if an object is sensed in a received millimeter wave (MMW) brightness temperature data set (e.g., via detection unit 120 of FIG. 1). The one or more null detection values can be generated from a polarization parameter that can include polarization difference or a polarization index in the received MMW brightness temperature data set, for example. At 1120, the method 1100 includes detecting if the object is present based on a comparison of the one or more null detection values to a predetermined threshold (e.g., via detection unit 120 of FIG. 1). At 1130, the method 1100 includes decomposing the received MMW brightness temperature data set into a plurality of image layers (or modes) (e.g., via SVD unit 150 of FIG. 1). Each image layer includes at least one feature of a scene that can include background noise, background clutter, ground debris, or the object, for example. As noted previously, this can also include generating one or more moments for each image layer to determine the shape, intensity, and/or location of the object, for example. At 1140, the method 1100 includes analyzing the plurality of image layers to detect the shape or location of the object (e.g., via identification unit 160 of FIG. 1). In one example, the object can be an explosive formed penetrator (EFP).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A detection system, comprising:
   a polarization analyzer that generates one or more null detection values if an object is sensed in a received millimeter wave (MMW) brightness temperature data set, wherein the polarization analyzer analyzes a polarization parameter in the received MMW radiation data set to generate the one or more null detection values; and
   an object detector that detects if the object is present based on a comparison of the one or more null detection values to a predetermined threshold.

2. The detection system of claim 1, wherein the object is an explosive formed penetrator (EFP).

3. The detection system of claim 1, wherein the polarization parameter includes polarization difference that is defined by $\Delta_{hv}=T_h-T_v$, where $T_h$ and $T_v$ are the horizontal and vertical brightness temperature components of the MMW brightness temperature data set acquired at a given observation angle θ, or includes a polarization index that is defined by $\delta_{hv}=(T_h-T_v)/(T_h+T_v)$ at the given observation angle.

4. The detection system of claim 3, wherein a temperature average $T_{avg}$ is employed by the polarization analyzer to detect contrast between cold sky temperature reflected from the metallic object and warm background terrain.

5. The detection system of claim 3, wherein a temperature average $T_{avg}$ is employed by the polarization analyzer to detect contrast between cold sky temperature reflected from the metallic object and warm background terrain.

6. The detection system of claim 1, further comprising a singular value decomposition (SVD) unit to decompose the MMW radiation data set into a plurality of image layers, wherein each image layer includes at least one feature of a scene that includes background noise, background clutter, ground debris, or the object.

7. The detection system of claim 6, wherein the SVD unit generates a filtered image by summing the plurality of image layers.

8. The detection system of claim 7, wherein the SVD unit generates a moment image for each of the plurality of image layers to facilitate a determination of an intensity or a position of the object.

9. The detection system of claim 8, further comprising an identification unit to identify the position of the object based on an analysis of the plurality of images or the moment image for each of the plurality of image layers.

10. The detection system of claim 1, further comprising a polarized MMW radiometer to generate the MMW radiation data set.

11. The detection system of claim 10, wherein the polarized MMW radiometer includes a linear antenna array to scan in an x, y, and z dimension and is mounted on a mobile platform.

12. The detection system of claim 11, wherein the linear antenna array generates a pushbroom fan beam that scans in the y and z dimensions and the x dimension is covered by motion of the mobile platform.

13. A detection system, comprising:
    a polarization analyzer that generates one or more null detection values if an object is sensed in a received millimeter wave (MMW) brightness temperature data set, wherein the polarization analyzer analyzes a polarization parameter in the received MMW brightness temperature data set to generate the one or more null detection values;
    an object detector that detects if the object is present based on a comparison of the one or more null detection values to a predetermined threshold;
    a singular value decomposition (SVD) unit that is enabled by the object detector to decompose the MMW brightness temperature data set into a plurality of image layers, wherein each image layer includes at least one feature of a scene; and
    an identification unit that analyzes the plurality of image layers from the SVD unit to determine a shape or a location of the object from the scene.

14. The detection system of claim 13, wherein the object is an explosive formed penetrator (EFP).

15. The detection system of claim 13, wherein the polarization parameter includes a polarization difference that is defined by $\Delta_{hv}=T_h-T_v$, where $T_h$ and $T_v$ are the horizontal and vertical brightness temperature components of the MMW brightness temperature data set acquired at a given observation angle θ, or includes a polarization index that is defined by $\delta_{hv}=(T_h-T_v)/(T_h+T_v)$ at the given observation angle.

16. The detection system of claim 13, wherein the SVD unit generates a filtered image by summing the plurality of image layers.

17. The detection system of claim 16, wherein the SVD unit generates a moment image for each of the plurality of image layers to facilitate a determination of an intensity or a position of the metallic object.

18. The detection system of claim 13, further comprising a polarized MMW radiometer to acquire the MMW brightness temperature data set.

19. A method, comprising:
    generating, by a processor, one or more null detection values if an object is sensed in a received millimeter wave (MMW) brightness temperature data set, wherein the one or more null detection values are generated from a polarization parameter in the received MMW radiation data set;
    detecting, by the processor, if the object is present based on a comparison of the one or more null detection values to a predetermined threshold;
    decomposing, by the processor, the received MMW brightness temperature data set into a plurality of image layers, wherein each image layer includes at least one feature of a scene; and
    analyzing, by the processor, the plurality of image layers to determine a shape or a location of the object from the scene.

20. The method of claim 19, wherein the object is an explosive formed penetrator (EFP).

\* \* \* \* \*